United States Patent [19]

Newton

[11] E Re. 29,352

[45] Reissued Aug. 16, 1977

[54] NON-TWISTED, HEATHER YARN AND METHOD FOR PRODUCING SAME

[75] Inventor: Richard C. Newton, Greenville, S.C.

[73] Assignee: Phillips Petroleum Company, Bartlesville, Okla.

[21] Appl. No.: 687,715

[22] Filed: May 19, 1976

Related U.S. Patent Documents

Reissue of:

[64] Patent No.: 3,811,263
Issued: May 21, 1974
Appl. No.: 228,626
Filed: Feb. 23, 1972

[51] Int. Cl.[2] ..... D02G 3/22; D02G 1/16; D02G 1/20

[52] U.S. Cl. ..... 57/140 R; 28/254; 57/140 BY; 57/140 J; 57/157 F

[58] Field of Search ..... 57/140 R, 140 J, 140 BY, 57/157 F; 28/72.12, 72.11

[56] References Cited

U.S. PATENT DOCUMENTS

| | | | |
|---|---|---|---|
| 2,191,791 | 2/1940 | Hardy et al. | 242/157 R X |
| 3,103,098 | 9/1963 | Dyer | 57/140 R |
| 3,110,151 | 11/1963 | Bunting, Jr. et al. | 57/157 F |
| 3,200,576 | 8/1965 | Maerov et al. | 57/140 BY |
| 3,220,173 | 11/1965 | Pitzl | 57/140 R |
| 3,251,181 | 5/1966 | Breen et al. | 57/140 R |
| 3,357,074 | 12/1967 | Allman et al. | 57/34 B X |
| 3,389,444 | 6/1968 | Fletcher et al. | 57/34 B X |
| 3,394,440 | 7/1968 | Van Holten | 57/34 B X |
| 3,449,903 | 6/1969 | Brown | 57/140 R |
| 3,473,315 | 10/1969 | LeNoir | 57/140 R |
| 3,501,819 | 3/1970 | Satterwhite | 57/140 R X |
| 3,537,251 | 11/1970 | Kumura et al. | 57/140 R |

*Primary Examiner*—Richard C. Queisser
*Assistant Examiner*—Charles Gorenstein

[57] ABSTRACT

A non-twisted, heather yarn is formed of a plurality of major yarn bundles at least one of which is of a substantially different color from the remaining bundles. Each major yarn bundle is formed of a multiplicity of continuous filaments and has from about 10 to about 90 percent of its filaments cohering to form secondary bundles with the remaining filaments of each major bundle varying in number along the length of the yarn, being interlaced with other major bundles of the yarn, and being randomly located about the yarn axis. Each of the secondary bundles in each unit length of the yarn of about 6 inches has a portion thereof formed of greater than about 30 percent of the filaments of its major bundle and each of the secondary bundles in each unit length of yarn of about 8 inches is non-uniformly, differently oriented relative to the yarn axis.

15 Claims, 7 Drawing Figures

NON-TWISTED, HEATHER YARN AND METHOD FOR PRODUCING SAME

Matter enclosed in heavy brackets [ ] appears in the original patent but forms no part of this reissue specification; matter printed in italics indicates the additions made by reissue.

It is desirable to produce a non-twisted yarn having a unique prominent heather for forming heather fabrics.

This invention therefore resides in a unique, non-twisted, heather yarn which is formed by controlling the impact of fluid and tension on the yarn to produce a yarn in which each of the secondary bundles in each unit length of yarn of about 6 inches has a secondary bundle portion formed of greater than about 30 percent of the filaments of its major bundle and each of the secondary bundles in each unit length of yarn of about 8 inches is non-uniformly, differently oriented relative to the yarn axis. Each major yarn bundle has from about 10 to about 90 percent of its filaments cohering to form secondary bundles with the remaining filament of each major bundle varying in number along the length of the yarn, being interlaced with other major bundles of the yarn, and being randomly oriented about the yarn axis.

Other aspects, objects, and advantages of the present invention will become apparent from a study of the disclosure, the appended claims, and the drawings.

The drawings are diagrammatic views of the process and product of this invention.

Figure 3:
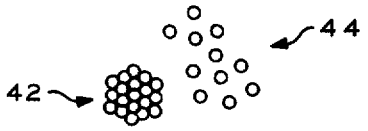
Figure 4:
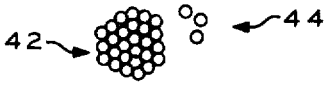
Figure 5:
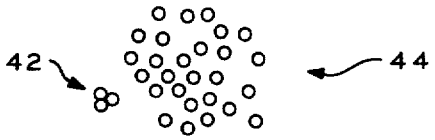
Figure 6:
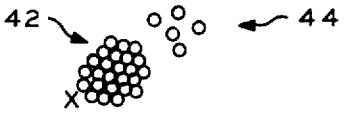
Figure 7:
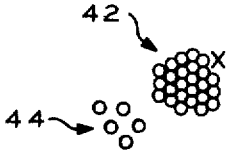

FIG. 3 is a cross sectional view of a major bundle showing a secondary bundle comprising about 65 percent of the total filaments, FIG. 4 shows a secondary bundle comprising about 90 percent of the total filaments, FIG. 5 shows a secondary bundle comprising about 10 percent of the total filaments, FIG. 6 shows a secondary bundle oriented at one location relative to an axis X of the yarn and FIG. 7 shows the remaining filaments oriented at another location relative to the axis X of the yarn.

Figure 1:
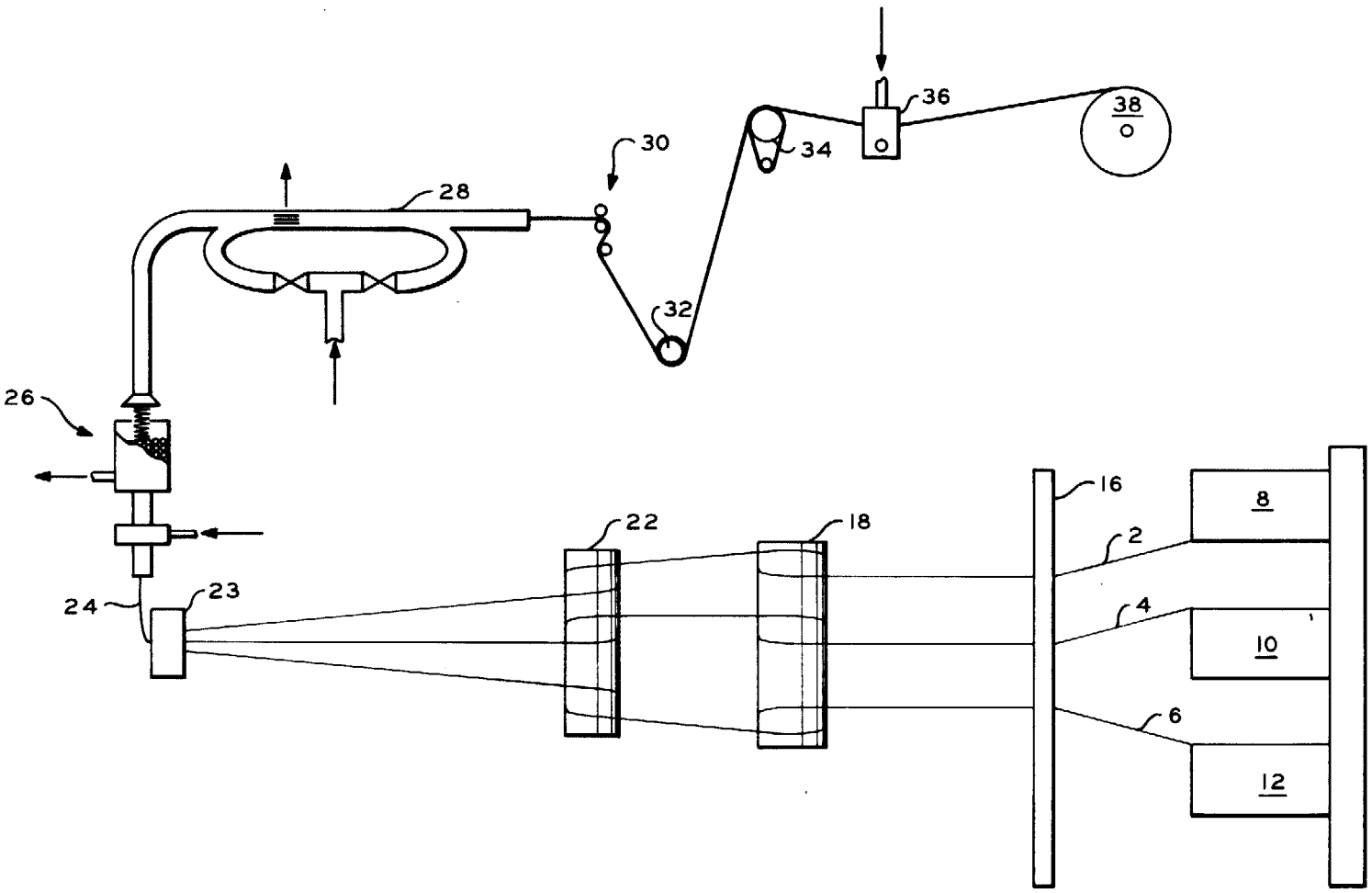
FIG. 1 shows the process of the invention.
Figure 2:
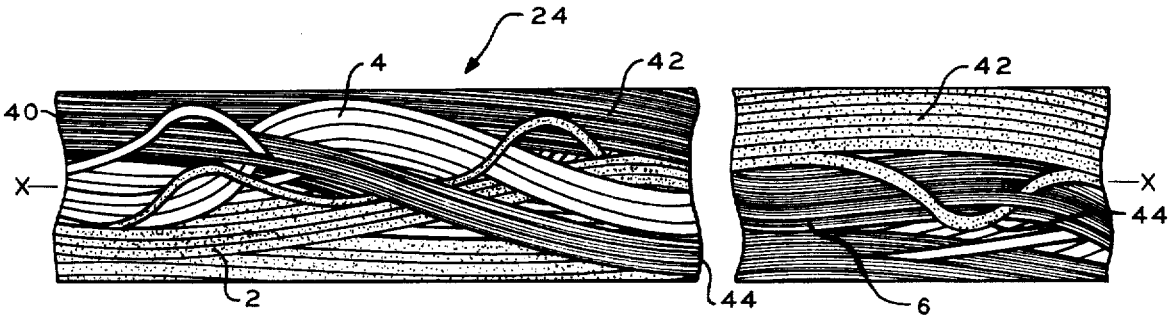
FIG. 2 shows a side view of the composite yarn of this invention that is formed by the process of FIG. 1, *except that the yarn was not textured,*

Referring to FIG. 1, a plurality of major yarn bundles 2, 4, 6 pass from their individual packages 8, 10, 12 which are mounted on a creel.

At least one of the major yarn bundles 2 or 4 or 6, preferably all of the major yarn bundles 2, 4 and 6, for example, are of substantially different colors relative one to the other. Each of the major yarn bundles is formed of a multiplicity of non-twisted, continuous, synthetic filaments.

The major bundles 2, 4, 6 are passed through an eyelet guide 16 about an in-feed draw roll 18 and about an out-feed draw roll 22 for drawing each of the major yarn bundles.

In the method of this invention, the out-feed draw roll 22 is maintained at a peripheral speed in the range of about 500 to about 2,000 meters per minute. The preferred speed is dependent upon the type of material being utilized and particularly the size and number of filaments. Once these variables have been determined, the particular optimum speed within the above speed range can easily be determined. It has been determined, however, that at speeds higher or lower than the above range, the hereafter more fully described yarn entanglement will be of reduced quality and quantity.

From the out-feed draw roll 22, the bundles 2, 4, 6 are brought into contact one with the other by a converging roller 23 for forming a composite yarn 24.

The composite yarn 24 can hereafter be passed through apparatus for texturizing or crimping the yarn at an elevated temperature in a zone of turbulence, for example, by passing the yarn through a fluid jet 26 into a chamber having a plurality of stacked members such as balls or rods as shown in the art and hereafter passed through a quench tube 28 at which location the yarn is cooled in a wad setting the crimp.

The composite yarn 24 discharging from the quench tube 28 thereafter is associated with apparatus for placing said composite yarn 24 under a tension in the range of about 0.03 to about 0.20 grams per denier for substantially straightening the fibers prior to entanglement.

The yarn can be placed in tension by a tension gate 30-idler roll 32-roll 34 assembly as shown in FIG. 1 and as known in the art. Other means as known in the art can be utilized.

The composite yarn is passed through an entangler 36 and thereafter is wound together forming a yarn package 38 with the yarn tension between roll 34 and package 38 being in a range of 0.008 to 0.03 grams per denier.

The entangler 36 has a plurality of gas or fluid jets which are connected to a pressurized gas source such as an air supply source for example. The entangler 36 has an opening for the passage of the composite yarn therethrough with the jets opening into a passageway of the entangler at spaced locations for impacting the yarn 24 with gas streams from a plurality of jets spaced a substantially equal arcuate distance one from the other about the axis of the yarn 24 and directed generally toward said axis. The yarn 24 is impacted by gas streams fed at about 40–150 psig while under a tension maintained in the range of about 0.008 to 0.03 grams per denier and while passing through the entangler 36 at a speed maintained in the range of about 62 percent to about 85 percent of the speed of the yarn at the location of the out-feed draw roll 22.

At feed pressures of less than 40 psig on the gas streams impacting the yarn the amount of entanglement will be insufficient and the percentage of filaments forming the secondary bundles will be greater than 90 percent thereby forming other than the unique heather yarn of this invention. At pressures greater than about 150 psi the amount of entanglement will be greater than desired and the percentage of filaments forming the secondary bundles will be less than 10 percent and there will not be intermittent portions where the secondary bundles are formed of greater than 30 percent over each 6 inches unit length thereby forming other than the unique heather yarn of this invention. Further, at tensions greater than about 0.03 grams per denier the amount of entanglement will be less than desirable, the major bundle will be formed with greater than 90 percent of the filaments of that bundle, the secondary bundles within a unit length of about 8 inches may not be differently oriented and the yarn will be different than the unique heather effect yarn of this invention. At tensions less than about 0.008 grams per denier, there will be an excessive amount of entanglement, the major bundle will be formed of less than 10 percent of the filaments of that bundle thereby producing a blended yarn as opposed to the unique heather yarn of this invention.

In order to accentuate the heather effect of this invention, the filaments of at least one, preferably all of the major bundles are of a trilobal cross-sectional configuration. These differences cause the unique heather yarn to be bold and of sparkling sheen which is of exceptionally pleasing appearance when utilized with the unique construction of this yarn.

Referring to FIGS. 2-7, the yarn has an axis "X" and is formed of a multiplicity of continuous synthetic filaments 40. As set forth above, the filaments 40 form a plurality of major bundles 2, 4, 6 at least a portion of which are of substantially different colors relative one to the others.

Each of the major bundles 2, 4, 6 has from 10 to about 90 percent of its filaments cohering to form a secondary bundle 42 (better seen in FIGS. 3-7) with the remaining filaments 44 of the major bundles varying in number along the length of the yarn 24, being interlaced with the other major bundles forming the yarn and being randomly located about the yarn axis X. The interlacing of the remaining filaments 44 can be with the secondary bundle or remaining filaments or both of one or more other major bundles.

In each unit length of the yarn 24 of about 6 inches, each of the secondary bundles has a portion thereof formed of greater than about 30 percent of filaments of its major bundle. Further, in each unit length of the yarn 24 of about 8 inches, each of the secondary bundles are differently oriented relative to the yarn axis. This unique movement about the axis and change in number of filaments cohering over respective unit lengths as shown in FIGS. 3-7 causes the dominance of the different colors to change and vary in a unique manner thereby causing the heather of the instant invention to be of superior quality and reproducibility relative to other yarns or the methods of forming them.

The filaments can be crimped, pigmented, dyed, and contain additives such as ultraviolet stabilizers, antioxidants, antistats, and the like, and can be of different or the same type material. The filaments can be formed of polypropylene, nylon, polyesters, and copolymers thereof. Particularly beautiful, useful, and appealing heather yarns are prepared as follows:

EXAMPLE

Polypropylene was melt spun into pigmented major bundles producing three colors, namely orange, yellow, and brown. Each major bundle was formed of 42 filaments. Total denier of the resultant yarn was 2,380 or about 20 dpf. The major bundles were processed on an apparatus similar to FIG. 1 wherein the out-feed draw roll was operating at about 750 meters/minute to draw the major bundles 4x. The major bundles were simultaneously crimped in a fluid jet with steam at 100 psig as the fluid medium, cooled in a quench tube to set the crimp, placed under 0.10 gram per denier tension for straightening the fibers prior to interlacing, interlaced in an interlacing jet using air at 50 psig while being held under 0.02 grams per denier tension and operating at 500 meters/minute to form a yarn combining the three colors. The resulting composite yarn was 2,500 denier. The yarn when tufted in a carpet exhibited a heather appearance.

Other modifications and alterations of this invention will become apparent to those skilled in the art from the foregoing discussion and accompanying drawing, and it should be understood that this invention is not to be unduly limited thereto.

What is claimed is:

1. A yarn having an axis and being formed of a multiplicity of continuous filaments, said filaments forming a plurality of major bundles at least one of which is of substantially different color relative to the remaining bundles, each of said bundles having from about 10 to about 90 percent of its filaments cohering to form a secondary bundle with the remaining filaments of the major bundle varying in number along the length of the yarn, being interlaced with other major bundles of the yarn, and being randomly oriented about the yarn axis, each of said secondary bundles in each unit length of yarn of about 6 inches having a portion thereof formed of greater than about 30 percent of the filaments of its major bundle and each of said secondary bundles in each unit length of yarn of about 8 inches being non-uniformly located relative to the yarn axis.

2. A yarn, as set forth in claim 1, wherein at least a portion of the filaments are crimped.

3. A yarn, as set forth in claim 1, wherein the major bundles are each of a substantially different color than the remaining bundles.

4. A yarn, as set forth in claim 1, wherein the remaining filaments of each major bundle are interlaced with the remaining filaments of another major bundle.

5. A yarn, as set forth in claim 1, wherein a portion of the remaining filaments of a major bundle are interlaced with the secondary bundle of another major bundle.

6. A yarn, as set forth in claim 1, wherein at least a portion of the filaments are of a tri-lobal configuration.

7. A yarn, as set forth in claim 1, wherein the filaments are formed of a composition selected from the group consisting of polypropylene, nylon, polyester, and copolymers thereof.

8. A yarn, as set forth in claim 1, wherein the filaments are pigmented filaments.

9. A method for forming a composite yarn having a plurality of non-twisted major yarn bundles at least a portion of which are of substantially different colors one to the others with said major yarn bundles each being formed of a multiplicity of continuous, synthetic filaments, comprising:

drawing each of a plurality of major yarn bundles with a drawing roll being driven at a peripheral speed in the range of about 500-2,000 meters per minute;

bringing the major yarn bundles into contact one with the other for forming a composite yarn;

impacting the yarn with gas streams discharging from a plurality of jets spaced a substantially equal arcuate distance one from the others about the axis of the yarn and directed generally toward said axis while said yarn is being moved past the discharging gas streams, said yarn being moved past the discharging gas streams at a rate of about 62 percent to about 85 percent of the speed of the yarn on the drawing roll, being under a tension during impacting in the range of 0.008-0.03 grams per denier and being impacted by streams having feed pressures in the range of about 40-150 psi for randomly entangling portions of the filaments and positioning portions of the yarn differently relative to the yarn axis for forming a yarn having a unique heather appearance.

10. In the method, as set forth in claim 9, including texturing the composite yarn prior to the entangling step.

11. A method, as set forth in claim 10, wherein the textured yarn is quenched prior to the entangling step.

12. A method, as set forth in claim 11, wherein the quenched yarn is placed under a tension in the range of about 0.03–0.20 grams per denier at a location upstream of the entangling zone.

13. A method, as set forth in claim 9, wherein the filaments of at least one of the major bundles are of a tri-lobal configuration.

14. A method, as set forth in claim 9, wherein the filaments of each of the major bundles are of a tri-lobal configuration.

15. A method, as set forth in claim 9, wherein the major bundles are each of a substantially different color.

* * * * *

UNITED STATES PATENT AND TRADEMARK OFFICE

CERTIFICATE OF CORRECTION

PATENT NO. : Re. 29,352

DATED : August 16, 1977

INVENTOR(S) : Richard C. Newton

It is certified that error appears in the above-identified patent and that said Letters Patent are hereby corrected as shown below:

Column 4, line 10, "other" should read --- the ---; line 15, "bundle" should read --- bundles ---; line 56, after "rate" insert --- in the range ---.

Signed and Sealed this

*Fourth* Day of *July 1978*

[SEAL]

*Attest:*

RUTH C. MASON
*Attesting Officer*

DONALD W. BANNER
*Commissioner of Patents and Trademarks*